United States Patent [19]

Cummings

[11] Patent Number: 5,525,037
[45] Date of Patent: Jun. 11, 1996

[54] OVERLAPPING SAIL WIND TURBINE

[76] Inventor: John Cummings, 3284 W. Meadowbrook, West Valley City, Utah 84119

[21] Appl. No.: 358,243

[22] Filed: Dec. 19, 1994

Related U.S. Application Data

[63] Continuation-in-part of Ser. No. 169,373, Dec. 17, 1993, abandoned.

[51] Int. Cl.[6] ........................................ F03D 3/06
[52] U.S. Cl. ....................... 416/117; 416/118; 416/132 B
[58] Field of Search ........................... 416/117, 118, 416/132 A, 132 B, 140, 17

[56] References Cited

U.S. PATENT DOCUMENTS

| | | | |
|---|---|---|---|
| 41,442 | 2/1864 | Morse | 416/117 |
| 201,400 | 3/1878 | Everhart. | |
| 580,761 | 4/1897 | Bratka | 416/117 |
| 802,791 | 10/1905 | Abbey | 416/117 |
| 893,337 | 7/1908 | Lynn | 416/118 |
| 925,063 | 6/1909 | White | 416/140 |
| 1,319,766 | 10/1919 | Gracey | 416/132 B |
| 1,352,952 | 9/1920 | Gracey | 416/118 |
| 1,753,302 | 4/1930 | Ramm | 416/117 |
| 1,810,113 | 6/1931 | Schlotzhauer. | |
| 2,006,024 | 6/1935 | Lockwood | 416/117 |
| 2,099,617 | 11/1937 | Nelson | 416/118 |
| 2,129,652 | 9/1938 | Dean | 416/117 |
| 3,895,882 | 7/1975 | Moyer. | |
| 3,920,354 | 11/1975 | Decker | 416/117 |
| 4,260,325 | 4/1981 | Cymara. | |
| 4,278,896 | 7/1981 | McFarland. | |
| 4,288,200 | 9/1981 | O'Hare. | |
| 4,365,935 | 12/1982 | Zukeran | 416/117 |
| 4,649,284 | 3/1987 | Hsech-Pen | 416/117 |

FOREIGN PATENT DOCUMENTS

| | | | |
|---|---|---|---|
| 2396878 | 3/1979 | France | 416/17 |
| 173578 | 12/1921 | United Kingdom | 416/117 |

*Primary Examiner*—Edward K. Look
*Assistant Examiner*—James A. Larson
*Attorney, Agent, or Firm*—Thorpe, North & Western

[57] ABSTRACT

A wind turbine for converting wind energy to useable energy having a plurality of overlapping sail members. The sail members extend radially outward from a vertically disposed shaft in three columns positioned equidistantly around the shaft. The overlapping sail members hang downwardly in a naturally biased, vertical orientation so as to block rotational movement of each other in one direction. This configuration allows the wind to engage with the sail members on one side of the shaft to rotate the shaft, and blow past the sail members on the other side of the shaft. Rotation of the cylinder is thus achieved while wind resistance is greatly minimized, regardless of the wind direction. A generator can be rotatably intercoupled with the cylinder to thereby convert the kinetic energy of rotation to useable energy. Each sail member is preferably positioned such that a gap resides between the sail member and the shaft, the gap being at least as wide as the sail member. Each sail member includes a rigid frame having a geometric centroid and a center of mass which resides above the geometric centroid when the frame is hanging downwardly.

13 Claims, 4 Drawing Sheets

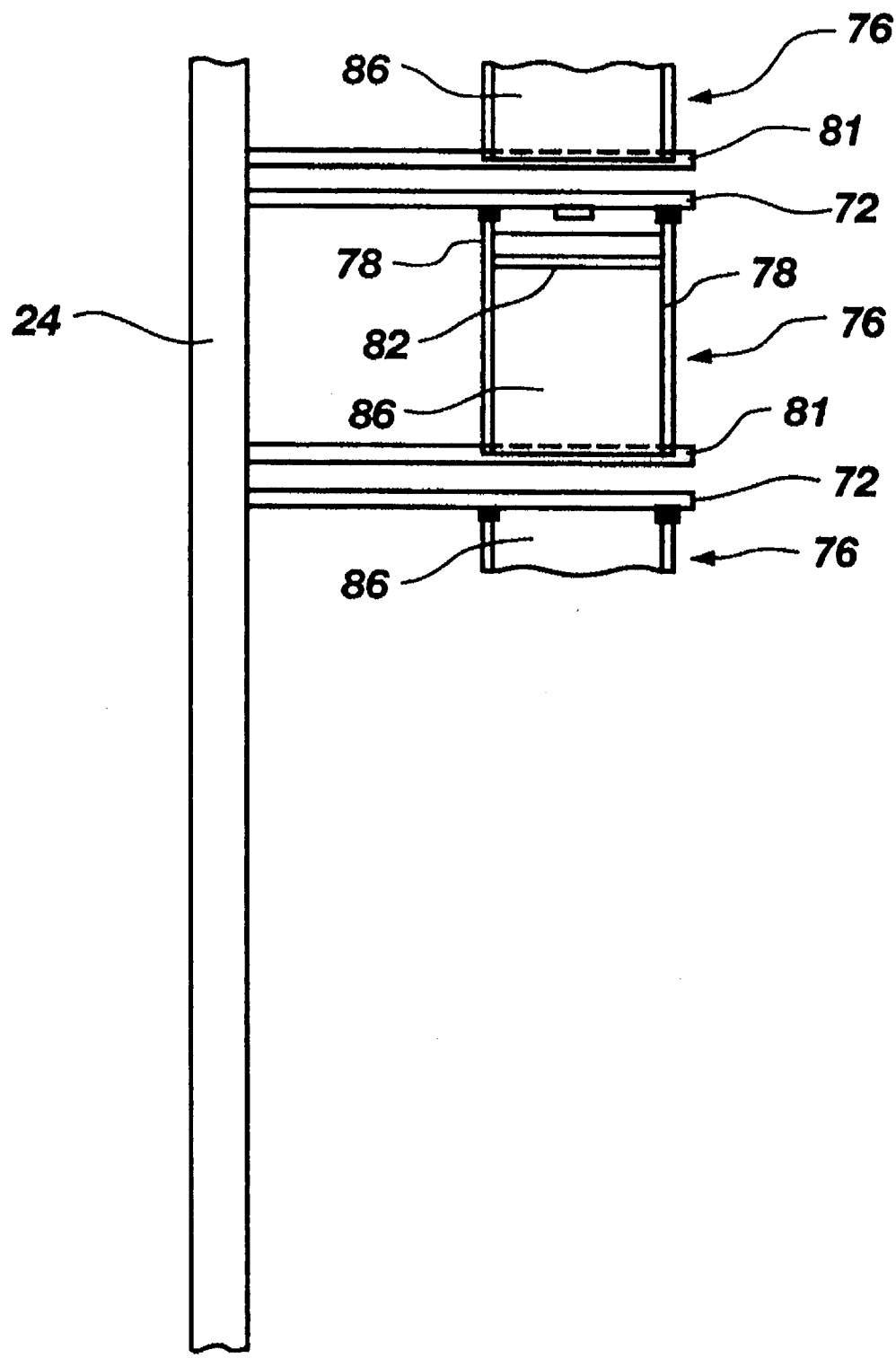

OVERLAPPING SAIL WIND TURBINE

This is a continuation-in-part of U.S. patent application Ser. No. 08/169,373, filed Dec. 17, 1993, entitled "OVERLAPPING SAIL WIND TURBINE AND METHOD", abandoned.

BACKGROUND OF THE INVENTION

1. The Field of the Invention

The present invention relates generally to windmills. More particularly, it concerns a wind turbine apparatus having overlapping sail members suitable for alternately catching the wind to turn a central cylinder and allowing the wind to pass, regardless of the wind direction.

2. The Background Art

Wind is among the oldest utilized energy sources. It has been known for centuries to build windmills and similar devices for catching the wind and converting the wind energy to mechanical energy in rotating windmill vanes. The kinetic energy in the rotating vanes was found to have many applications. It was initially used as a source of mechanical energy to drive various machinery such as grinders, water pumps, and so forth. As electrical energy developed into a popular energy source, it was discovered to intercouple a rotational gear system to the :rotating wheel base, and the gear system to an electrical generator. In this way, wind energy became convertible to electrical energy. This has motivated the development of a number of windmill systems and methods of harnessing the wind.

For example, U.S. Pat. No. 3,895,882 (issued Jul. 22, 1975 to Moyer) discloses a vertically disposed cylinder including a plurality of wind-engaging blades for inducing rotation of the cylinder about its vertical axis. Moyer's discovery, while effective in harnessing wind energy, has a number of disadvantages. The blades are not rotatable independent of the cylinder, such that each blade causes wind resistance against rotation of the cylinder about half of the time. The solution to this problem has been generally to add a moveable wind shield which blocks the wind from one side of the cylinder. The shield must be moved every time the wind changes direction, and thus requires significant operator attention. Since the wind often blows in multiple directions at a time, it is difficult to prevent wind resistance even with a shield. It is also difficult to disengage the device for resting, repair, and so forth. The power output of this type of windmill is limited by such disadvantages.

The Moyer patent is one of many patents directed to vertically disposed windmill structures. See, for example, U.S. Pat. Nos. 4,288,200 (issued on Sep. 8, 1981 to O'Hare), 4,278,896 (issued on Jul. 14, 1981 to McFarland), 4,260,325 (issued on Apr. 7, 1981 to Cymara), 1,810,113 (issued on Jun. 16, 1931 to Schlotzhauer), and 201,400 (issued Mar. 19, 1878 to Everhart). Each of these inventions relies of some kind of wind deflector, and the novelty of each generally subsists in the combination of the blade design therewith.

There is thus a need for a windmill device which can harness the wind without the need for a wind deflector, and which is easily disengageable.

OBJECTS AND SUMMARY OF THE INVENTION

It is therefore an object of the present invention to provide a wind turbine for converting wind energy to useable energy.

It is an additional object of the invention to provide such a wind turbine which is inexpensive and easy to use.

It is another object of the invention to provide such a wind turbine which eliminates the need for a wind deflector.

It is a further object of the invention to provide such a wind turbine which is easily disengageable.

The above objects and others not specifically recited are realized in an illustrative embodiment of a wind turbine having a plurality of overlapping sail members. The sail members extend radially outward from a vertically disposed shaft in three columns positioned equidistantly around said shaft. The overlapping sail members hang downwardly in a naturally biased, vertical orientation so as to block rotational movement of each other in one direction. This configuration allows the wind to engage with the sail members on one side of the shaft to rotate the shaft, and blow past the sail members on the other side of the shaft. Rotation of the cylinder is thus achieved while wind resistance is greatly minimized, regardless of the wind direction. A generator can be rotatably intercoupled with the cylinder to thereby convert the kinetic energy of rotation to useable energy.

Additional objects and advantages of the invention will be set forth in the description which follows, and in part will be apparent from the description, or may be learned by the practice of the invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which:

FIG. 7 illustrates a fragmented view of another alternative embodiment of the wind turbine of FIG. 1.

DETAILED DESCRIPTION OF PRESENTLY PREFERRED EMBODIMENTS

Figure 1:
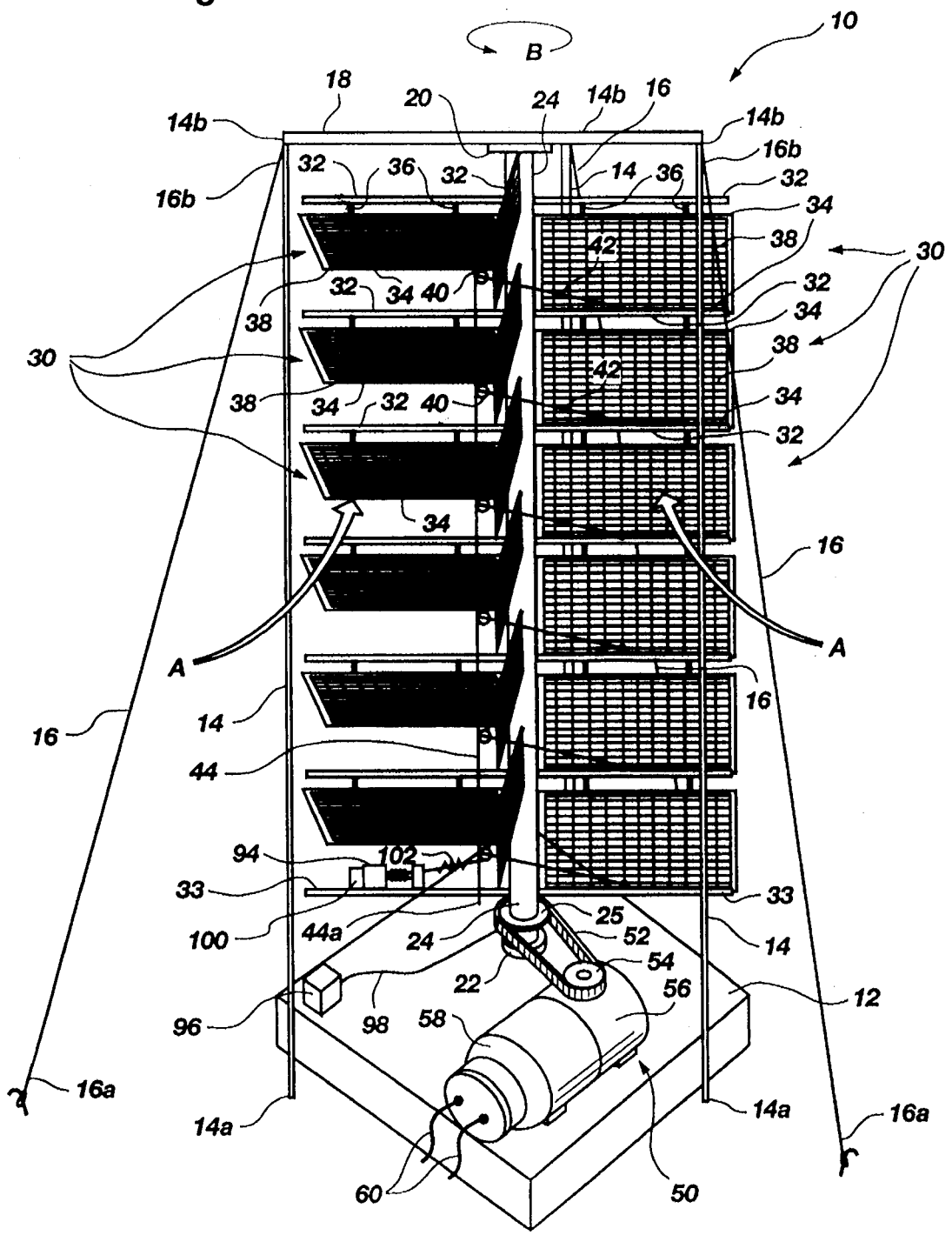
FIG. 1 illustrates a perspective view of a wind turbine made in accordance with the principles of the present invention.

Reference will now be made to the drawings wherein like structures will be provided with like reference numerals.

Figure 2:
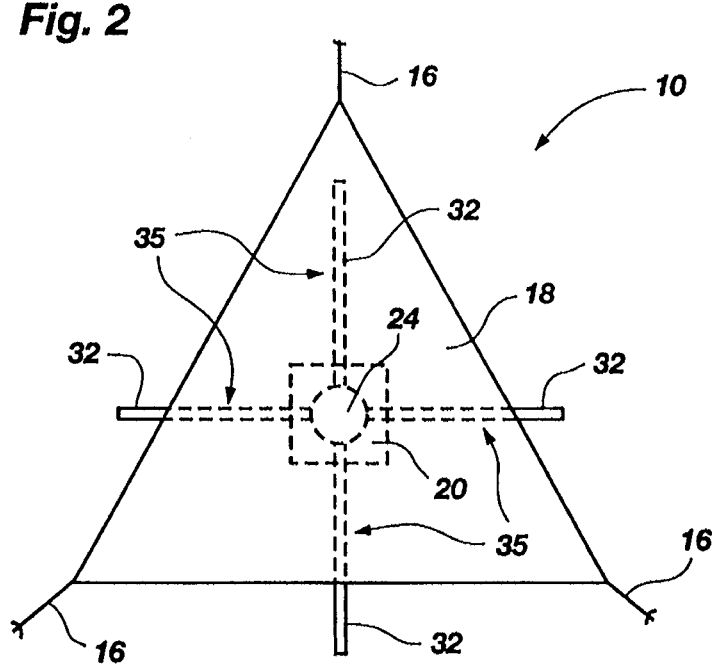
FIG. 2 illustrates a plan view of the wind turbine of FIG. 1, with portions thereof shown in phantom line.
Figure 3:
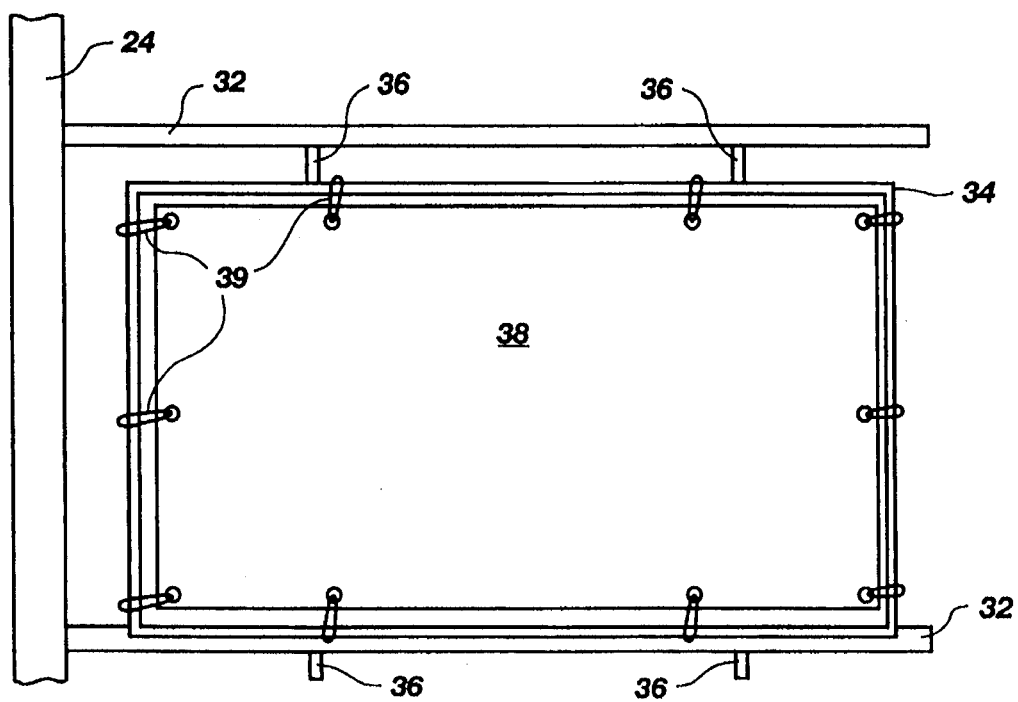
FIG. 3 illustrates a side view of a sail member of the wind turbine of FIG. 1.

FIGS. 1-3 illustrate the main features of a wind turbine structure, generally designated at 10, in association with an electric generator 50. The generator could be replaced with a water pump, or some other energy-utilizing device. Supporting structure includes various components immovably secured to the ground, including a base 12, three perimeter support columns 14, and three guy wires 16 attached to said support columns. The perimeter support columns 14 are secured to the ground at lower ends 14a, and to a top plate 18 at upper ends 14b. The guy wires 16 are secured to the ground at lower ends 16a, and to the upper ends 14b of the support columns at upper ends 16b. The top plate 18 may be triangular as shown, or any other suitable shape, such as circular. Upper and lower bearing supports 20 and 22 are secured in the top plate 18 and the base 12, respectively.

Vertically and rotatably disposed within the bearing supports 20 and 22 is a central cylinder 24 including a gear sprocket 25 fixedly attached thereto. The cylinder 24 may comprise any of a number of alternative configurations, for example, a solid rotational cylinder, or a central support column rotatably circumscribed by a tubular shaft. A radial array of sail members 30 extends radially outward from the cylinder 24, arranged in four columns 35 of sail members (shown most clearly in FIG. 2) positioned in approximately ninety degree increments as shown. Each sail member 30 includes a support bar 32 fixedly attached at a proximal end to the central cylinder 24. A rigid sail frame 34 defining an interior frame opening is rotatably attached to the support bar by hinge members 36. Sail material 38 extends across and covers the interior opening of the frame 34, and is anchored thereto by fasteners 39 (not shown in FIG. 1) to complete the sail member 30.

A plurality of eyelets 40 are secured to the support bars 32 of one of the columns of sail members. A corresponding plurality of pull cables 42 are secured at first ends to a lower edge of the sail frames 34 of a second, adjacent column of sail members. Opposing second ends of the pull cables 42 are passed through the eyelets 40 and secured to a control cable 44. Each eyelet 40 is located higher than the secured first end of the pull cable 42 extending through said eyelet. The control cable 44 hangs down vertically to a pull end 44a.

The generator 50 includes a chain 52 and a gear sprocket 54 extending from a gear reduction apparatus 56. Secured to the gear reduction apparatus 56 is an electrical generator apparatus 58, from which a pair of lead wires 60 extend.

The purpose and interrelationship of the elements identified above will be discussed in more detail below, in reference to FIGS. 1–3.

With the cylinder 24 in a vertical orientation as shown, wind blowing in any direction will cause rotational movement of the cylinder in the direction designated by arrow B. This can be explained as follows. The arrows A represent a given wind direction. Each sail frame 34 overlaps the support bar 32 of the sail member 30 directly beneath it, except that the lowest sail frames overlap support rods 33. Further, all sail frames 34 overlap the same, or corresponding, side of the bars 32 and rods 33.

It will therefore be appreciated that whenever the wind blows, the sail frames 34 on one side of the cylinder 24 (the right side in FIG. 1) will each be blocked from rotating about its respective support bar 32 by the bar 32 or rods residing directly beneath. This permits these particular sail frames to catch the wind and cause rotation of the cylinder 24 in the direction of arrow B. As the cylinder 24 rotates, each sail member 30 eventually rotates to the opposite side of the cylinder 24 (the left side in FIG. 1). The sail frames 34 are no longer blocked by the bars 32 and rods 33 but are now lifted upwardly by the wind as shown to permit the wind to blow past. This inhibits wind resistance to rotation of the cylinder 24.

The independent rotatability feature of the frames 34 significantly minimizes wind resistance against rotation of the cylinder 24 at all times and regardless of wind direction. This eliminates the need for a wind deflector. Since the wind often blows in multiple directions simultaneously, this particular wind resistance minimizer feature is operational at all times without operator attention. It is therefore more effective than a wind deflector, even those which are scrupulously repositioned by the operator with each major change in wind direction.

The kinetic energy of rotation of the cylinder 24 is convertible into useful purposes as known in the field, such as mechanical or electrical energy. The gear sprocket 25 rotates with the cylinder 24 since it is fixedly attached thereto. The gear sprocket 54 of the electrical generator 50 is rotatably intercoupled with the cylinder gear sprocket 25 by the chain 52 and is thereby confined to rotation with said cylinder gear sprocket 25. The generator gear sprocket 54 thus operates to receive kinetic energy of rotation from said cylinder gear sprocket 25 through the chain 52. The gear reduction apparatus 56, electrical generator apparatus 58, and lead wires 60 operate as known in the art to convert this kinetic energy of rotation into useable electrical or mechanical energy.

It is to be understood that any type of energy extraction apparatus capable of extracting energy from a rotating member is in accordance with the principles of the invention. Further, any apparatus capable of rotatably supporting a column is useable as the bearing supports 20 and 22, such as ball bearing, thrust bearing, roller bearing or pin bearing structures.

Any blocking structure may be used to block rotational movement of the frames 34, such as separate blocking pegs attached to the cylinder 24 which extend into the path of rotation of the frames 34. Further, other structure may be used as the sail members 30. For example, the frames 34 and sail material 38 may be replaced with solid members made of wood, steel, or composite material. However, the lighter the wind catching structure is, the greater the efficiency and power output of the wind turbine 10.

It is to be understood that the frames 34 can be made rotatable about their centers or their bottom edges, instead of about their upper edges as illustrated. For example, the sail frames 34 may be rotatably hung from their center sections about the support bars 32. Alternatively, the frames 34 may be rotatably mounted to the bars 32 at their bottom edges to extend upwardly therefrom, such that upper portions of said frames engageably overlap the bars 32 located directed above them. This embodiment would require some additional structure for prevent the frames from falling downward into a hanging position. For example, a plurality of stopping pegs extending outward from the cylinder 24 behind each frame 34 could be installed. Each frame 34 would be blocked by the upper bars 32 when catching the wind, and by the stopping peg at some inclined position to allow the wind to pass.

An additional aspect in accordance with the principles of the invention is the disabling capability of the wind turbine 10. An operator desiring to prevent rotational movement of the wind turbine need only pull downwardly on the pull end 44a of the control cable 44. This causes the cable 44 to draw the pull cables 42 through the eyelets 40 such that said pull cables lift upwardly the sail frames 34 to which they are attached. If these sail frames are lifted up high enough, say forty-five degrees from horizontal, the entire column is effectively removed from operation since the wind will pass by the lifted frames instead of being caught by the sail material 38.

It will be appreciated that the four right-angle columns of sail members 30 will stop catching the wind if one of the columns is effectively removed from operation as described.

The system will gradually come to rest with the disabled column of sail members facing the wind on the normally operational side of the cylinder 24 (right side in FIG. 1). None of the columns of sails are significantly engageable with the wind when in this position. The column opposite the disabled column (left column in FIG. 1) is not operational as normal, and the remaining two columns are common to a plane extending in the direction of the wind and thus do not catch the wind. Any method of lifting up or even removing the sails of one of the columns will accomplish the disabling feature in accordance with the principles of the present invention.

The invention is a major advance in the field of wind power generation. The geographical areas with frequently occurring natural convection currents will benefit greatly from my discovery. The structure of my invention can be accomplished inexpensively. It is preferred to use light, tubular rods for the frames 34, such as aluminum, and strong solid steel members for the rods 32. The cylinder 24 can alternatively comprise a solid cylinder or a solid non-circular member such as a square, but is preferred to be a bearing-supported tubular member circumscribing a solid cylindrical support column. The cylinder 24 is preferably made of sturdy material, such as structural steel in the manner of an I-beam.

The support structure must be strong enough to withstand updrafts tending to lift upwardly the top plate 18, the sail members 30, and so forth. Moreover, the centrifugal force of the rotating columns of sails will itself require sturdy, solid support, although it is envisioned that the system will rotate slowly due to resistance in the generator 50. The perimeter support columns 14 and guy wires 16 must therefore be made of sturdy material, preferably steel or any effective metal alloy. The perimeter support columns 14 are spaced away from the cylinder 24 by a certain distance to thereby permit the sail members 30 to pass by said columns during rotation movement of said cylinder 24. The more sail surface area 38 there is, the more power can be generated. It is preferred to use conventional sail material for the material 38.

It will be appreciated that the sail members 30 are less expensive to make than their solid steel, prior art competitors. A tubular frame 34 covered with sail material 38 is light and requires less support structure. The invention therefore increases the benefit/cost ratio. The lighter sail structure also increases the efficiency and power output of the system since the light weight will rotate faster in the wind and therefore produce more kinetic energy of rotation. It is envisioned that the wind turbine 10 will be very tall, perhaps of a height equivalent to mountain top radio antennae, in order to provide more sail surface area. The combination of light sail structure and constant minimization of wind resistance and operability of the system regardless of wind direction results in a much cheaper source of power than conventional hydroelectric energy sources.

Figure 4:
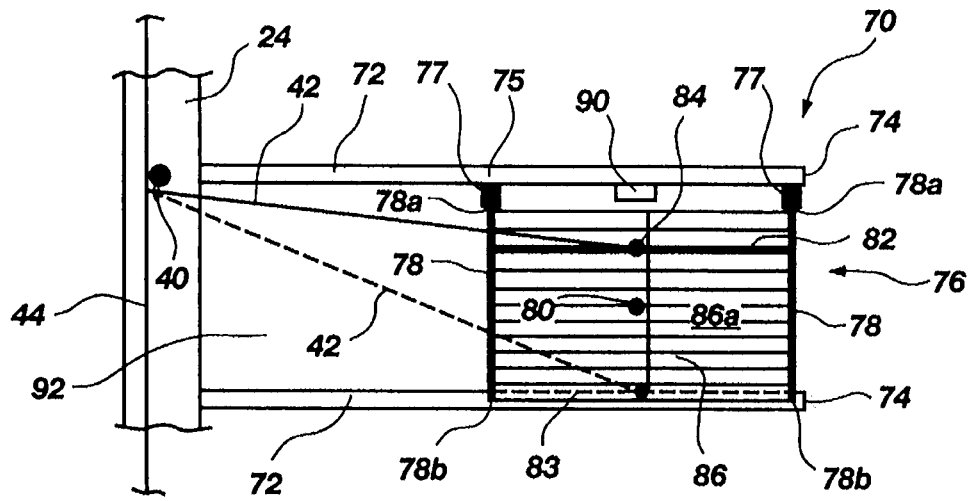
FIG. 4 illustrates a fragmented view of an alternative embodiment of the wind turbine of FIG. 1.
Figure 5:
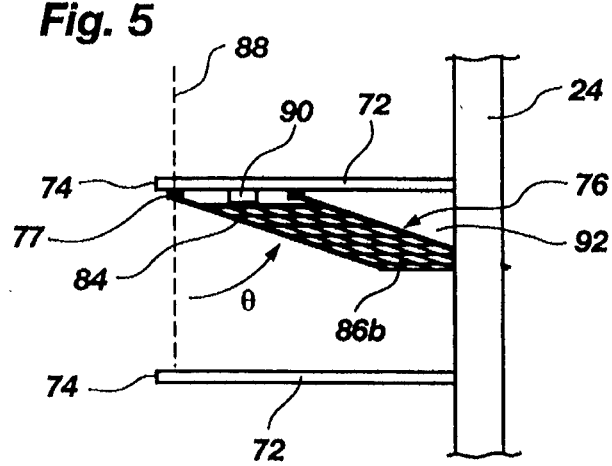
FIG. 5 illustrates the wind turbine of FIG. 4 in a different position.
Figure 6:
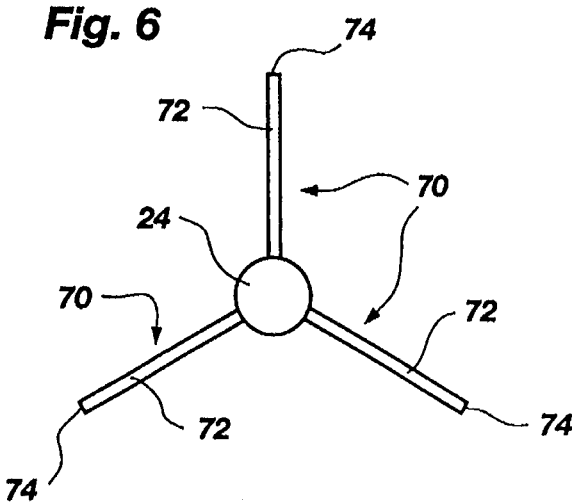
FIG. 6 illustrates a plan view of an alternative embodiment of the wind turbine of FIG. 2.

Referring now to FIGS. 4–6, a presently preferred embodiment in accordance with the principles of the present invention will now be described. The wind turbine 10 preferably comprises three radial columns of vanes, generally designated at 70. Applicant has found that the three radial columns of vanes 70 (shown most clearly in the plan view of FIG. 6) provides optimal wind engagement and consequent power output, because three columns provides less pressure buildup and interference than four rows.

Each vane 70 includes a support bar 72 (essentially the same as the support bar 32 of FIG. 1) extending outwardly (preferably radially outwardly) from the cylinder 24 and terminating in a distal end 74. A rigid frame designated generally at 76 is rotatably attached to the support bar 72 so as to hang downwardly therefrom, by hinge members 77. The frame 76 includes first and second spaced-apart rods 78 defining an interior frame area having a geometric centroid 80. The rods 78 are intercoupled by a cross bar 82 having a center of mass 84. Preferably, the center of mass 84 resides above the geometric centroid 80 when the frame 76 hangs downwardly from the support bar 72, such that the frame 76 is characterized by an absence of any support member intercoupling the rods 78 which has a center of mass residing below the geometric centroid 80 of the interior frame area when the frame 76 hangs downwardly from the support bar 72. The hinge members 77 being secured to either the rods 78 (as shown) or to the cross bar 82.

A sheet of preferably wind-resistant material 86 extends across and covers at least most (preferably all) of the interior frame opening. The sheet of material 86 is anchored to the frame 76 so as to be engagable with the wind to thereby cause rotation of the frame 76 about the support bar 72. The sheet 86 has first and second opposing sides 86a (FIG. 5) and 86b (FIG. 6).

The support bars 72 of lower vanes 70 operate as blocking means for blocking rotational movement of the frames 76 located directly above them. More specifically, distal ends 78b of the spaced-apart rods 78 of the higher vanes 70 engageably overlap one side of the support bars 72 of the vanes 70 located directly beneath them. In this manner, the blocking means in the form of lower support bars 72 blocks rotational movement of the frames 76 in a first rotational direction only, to enable the wind to engage against the first side 86a of the sheet 86 and force the frame 76 against the support bar 72 directly beneath it to cause rotation of the cylinder 24. The wind is thus also enabled to engage against the opposing second side 86B of the sheet 86 to rotatably lift and blow past the sheet 86 and frame 76 when rotation of the cylinder 24 causes the opposing second side of the sheet to face the wind, to thereby enable continuous rotational wind-driven movement of the cylinder 24. As suggested above, alternative blocking structure separate from the support bars 72 may be used to accomplish the blocking function, such as pegs 81 in FIG. 7, which are attached to the cylinder 24 and extend into the path of rotation of the frames 76.

As shown in FIG. 5, the force of the wind against the second side 86b of the sheet 86 operates to raise the frame 76 and sheet 86 in a second rotational directional to a rotated position at some angle Θ relative to a vertical plane 88. Applicant has found that rotational speed of the cylinder 24 is reduced if the angle Θ exceeds ninety degrees. Therefore, an optional blocking shoulder 90 can be provided to extend outwardly (preferably radially outwardly) from the support bar 72. The shoulder 90 is configured and dimensioned to engage with the cross bar 82 as in FIG. 5 to thereby limit rotational movement of the frame 76 in the second rotational direction to a predetermined angle Θ, such as eighty-nine degrees.

The frame 76 of FIG. 4 with the cross bar 82 was invented by applicant to produce a frame member having most of its weight near the pivot point of the frame 76 as it pivots about the support bar 72 in response to wind force. Wind turbine vanes or sails having bottom cross bars or otherwise comprising a frame with a center of mass below the geometric centroid of the sail frame area operate to increase the wind velocity sufficient to lift the frame 76 and sheet 86 when the wind blows against the second side 86b of the sheet 86. This produces an adverse wind drag which reduces the efficiency and power output of the wind turbine 10. Applicant's frame 76 is built such that the center of mass of the frame 76 resides above the geometric centroid 80 of the interior frame area. The cross bar 82 is preferably located as close as practicable to the support bar 72. Most preferably, the center of mass 84 of the cross bar 82 resides above the geometric centroid 80 when the frame 76 hangs downwardly from the support bar 72, such that the frame 76 is characterized by an absence of any support member intercoupling the rods 78 which has a center of mass residing below the geometric centroid 80 of the interior frame area when the frame 76 hangs downwardly from the support bar 72. However, any vane or sail member including a frame having a center of mass which resides above the geometric centroid 80 of the interior frame area when the frame hangs downwardly is in accordance with the principles of the present invention.

Applicant has discovered that a substantial amount of air pressure builds up against the columns of vanes 70, which interferes with useful wind engagement to thereby reduce power output of the cylinder 24. This problem is solved by configuring each frame 76 to extend along only a portion of its corresponding support bar 72, so as to provide a substantial gap 92 between the frame 76 and the cylinder 24 sufficient to permit air currents to pass between the frame 76 and the cylinder 24 shaft to thereby reduce the air pressure buildup. Preferably, each frame 76 is spaced apart from the cylinder 24 sufficiently that the gap 92 has a width which is greater than one-fourth of a lateral width of the frame 76. Most preferably, each frame 76 extends along approximately one-half of its support bar 72 from the distal end 74 of the bar to a midpoint 75 of the bar such that the gap 92 is approximately as wide as the frame 76, or at least as wide as the frame.

The function of the gap 92 can be described further, as follows. Picture the surface of a plane extending from the cylinder 24 to the point the farthest distance from the cylinder 24 at a right angle to the direction the wind is blowing. This is the interactive plane where the vanes 70 are engaged by the wind. Any point in this plane that has a constant resistance to the flow of the wind will build up high pressure behind it forcing the wind around it and thus reducing the power output of the unit. This new design presents a catching surface to the wind that moves back and forth across this plane. No point of the plane has a constant resistance from the catching surface; or put another way, an opening passage 92 for the wind to pass through moves back and forth across the plane through the engagement cycle.

Each frame 76 is configured such that the spaced-apart rods 78 extend radially outwardly from the support bar 72 from proximal ends 78a of the rods and terminate in the distal ends 78b. The rods 78 are disposed vertically when the frame 76 is positioned common to a vertical plane, and the cross bar 82 extends laterally between the rods 78 near their proximal ends 78a such that the frame 76 exhibits an upside-down U shape when hanging downwardly.

The same disabling means in the form of pull cables 42, eyelets 40 and control cable 44 as described above in reference to FIG. 1 is preferably applied as shown in FIG. 4. The pull cables 42 intercouple the frame 76 (preferably the cross bar 82 as shown) and the control cable 44 and are passed through the eyelets 40. The control cable 44 is selectively retractable to thereby rotatably raise the frames 76 upwardly to a desired degree. Applicant has found that a winch 94 (FIG. 1) can be secured to the lowest support bar as shown (or to the cylinder 24) for selectively retracting and releasing the control cable 44. The pull cables are applied to at least some (preferably all) of the frames 76 of one of the columns of vanes 70 to rotates the frames 76 upwardly out of engagement with at least some of the wind to thereby reduce engagement of the wind against the sheets 86 to control rotational velocity of the cylinder 24. Rotational movement of the cylinder 24 can be completely stopped by retraction of the control cable 44 to raise the frames 76 attached to the cable 44 to substantially horizontal positions such that significant engagement of the wind against the raised sheets is prevented.

A computer control module 96 can be electronically intercoupled to the winch 94 via electric cable 98 and programmably arranged in accordance with principles generally known to those skilled in the relevant computer field to enable an operator to selectively retract and release the control cable 44. Alternatively, the computer control module 96 can be made responsive to a signal produced by a velocity sensor to operate the winch 94 automatically so as to maintain the rotational movement of the cylinder 24 at some desired constant rate. The control cable 44 may be provided with a shock absorbing means disposed on the cable 44 for absorbing impact forces which might become applied to the cable 44. For example, a spring member 102 can be incorporated into the control cable 44 as shown in FIG. 1 to provide a shock absorbing function.

It is to be understood that the frames 76 may include a cross bar 83 (shown in phantom line in FIG. 4) intercoupling the distal ends 78b of the rods 78. The cross bar 83 can be provided in lieu of, or in addition to, the cross bar 82. In such embodiments, it may be desirable to secure the pull cables 42 to the cross bar 83 instead of to the cross bar 82 (as shown in phantom line in FIG. 4).

It will be appreciated that one embodiment may be provided in accordance with the principles of the present invention which includes the frame 76 as shown in FIG. 4, but without the gap 92 (i.e. positioned in the manner of the sail members 30 of FIG. 1), and without the disabling means of the pull cables 42, eyelets 40 and control cable 44. A second embodiment may be provided to include the sail members 30 positioned to create the gap 92, and thus without utilizing the frame 76 of FIG. 4.

There are thus many possible configurations of the invention, and many additional environments in which the invention can be used. For example, the cylinder 24 may alternatively be horizontally disposed, or even diagonally. It is possible to rotatably support such a horizontal central cylinder between two high rise buildings, for example, in order to take advantage of the convection currents which pass therebetween and turn them into power. The sail members 30 could be adapted accordingly to operate in the manner described above to cause rotation of a horizontal central cylinder. While the present invention is described in terms of an electricity source, it is to be understood that the present invention is not limited thereto but may be useful in any application requiring rotating members. The principles of the invention may thus be used in any setting requiring the advantages thereof. Those having ordinary skill in the field of this invention will appreciate the advantages of the invention, and its application to a wide variety of uses.

The present invention represents a significant advance in the field of wind driven apparatus. It is noted that many of the advantages of the present invention accrue due to the rotating sail frames 34 which are blocked from rotating in one direction to thereby alternately catch the wind and allow the wind to pass. The problems noted above and others not discussed are overcome to a significant degree by the present invention. Those skilled in the art will appreciate from the preceding disclosure that the objectives stated above are advantageously achieved by the present invention.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A wind driven apparatus comprising:

elongate shaft means;

receiving means for rotatably receiving the elongate shaft means such that said elongate shaft means is rotatably journaled within the receiving means to thereby permit rotational movement of said shaft means about a longitudinal axis thereof;

wind-engaging means disposed on the shaft means for engaging with the wind to thereby cause rotation of the shaft means, said wind-engaging means including a plurality of vanes arranged in a radial array of three radial columns of vanes, said columns being disposed substantially equidistantly from each other about the shaft means, each vane comprising:

a support bar having a longitudinal axis and extending outwardly from the shaft means and terminating in a distal end;

a rigid frame defining an interior frame area and being coupled to the support bar so as to hang downwardly therefrom, the interior frame area having a geometric centroid and the frame having a center of mass which resides above said geometric centroid when the frame hangs downwardly from the support bar, said frame being rotatably disposed so as to be rotatable about the longitudinal axis of the support bar; and a sheet of wind-resistant material extending across and covering at least most of the interior frame area and being anchored to the frame so as to be engagable with the wind to thereby cause rotation of the frame about the support bar, said sheet having first and second opposing sides;

wherein the radial columns of vanes comprise lower vanes and higher vanes and wherein the support bars of lower vanes are located directly beneath higher vanes such that distal ends of the higher vanes engageably overlap one side of said support bars of lower vanes for blocking rotational movement of the vanes in a first rotational direction, to enable the wind to engage against the first sides of the sheets of the vanes and force the vanes against said support bars of lower vanes to cause rotation of the shaft means, such that the wind is also enabled to engage against the second sides of the sheets of the vanes to rotatably lift and blow past the vanes when rotation of the shaft means causes said second sides to face the wind to thereby enable continuous rotational wind-driven movement of the shaft means;

wherein each frame extends along only a portion of its corresponding support bar so as to provide a substantial gap between the frame and the shaft means sufficient to permit air currents to pass between the frame and the shaft means to thereby reduce air pressure buildup, wherein the gap is at least as wide as the frame.

2. An apparatus as defined in claim 1, wherein each frame extends along approximately one-half of the support bar from the distal end of the bar to a midpoint of the bar such that the gap is approximately as wide as the frame.

3. An apparatus as defined in claim 1, wherein each frame comprises first and second spaced-apart rods and a cross bar intercoupling said rods, wherein said rods extend radially outwardly from the support bar from proximal ends of the rods and terminate in distal ends, such that said rods are disposed vertically when the frame is positioned common to a vertical plane, the cross bar extending laterally between the rods near their proximal ends such that the frame exhibits an upside-down U shape when hanging downwardly.

4. An apparatus as defined in claim 1, said apparatus further comprising:

disabling means attached to at least some of the frames of at least one of the columns of vanes for selectively rotating said frames upwardly out of engagement with at least some of the wind to thereby reduce engagement of the wind against the sheets of the vanes so as to selectively control rotational velocity of the shaft means.

5. An apparatus as defined in claim 4, wherein the disabling means further comprises cable means attached to said at least some of the frames of one of the columns of vanes, said cable means being selectively retractable to thereby rotatably raise said frames upwardly.

6. An apparatus as defined in claim 4, wherein the disabling means is configured to raise upwardly the frames of an entire column of vanes to substantially horizontal positions to thereby prevent significant engagement of the wind against the sheets of said entire column of vanes to thereby stop rotational movement of the shaft means.

7. A wind driven apparatus comprising:

elongate shaft means;

receiving means for rotatably receiving the elongate shaft means such that said elongate shaft means is rotatably journaled within the receiving means to thereby permit rotational movement of said shaft means about a longitudinal axis thereof;

wind-engaging means disposed on the shaft means for engaging with the wind to thereby cause rotation of the shaft means, said wind-engaging means including a plurality of vanes, each vane comprising:

a support bar having a longitudinal axis and extending outwardly from the shaft means and terminating in a distal end;

a rigid frame defining an interior frame area and being coupled to the support bar so as to hang downwardly therefrom, the interior frame area having a geometric centroid and the frame having a center of mass which resides above said geometric centroid when the frame hangs downwardly from the support bar, said frame being rotatably disposed so as to be rotatable about the longitudinal axis of the support bar; and a sheet of wind-resistant material extending across and covering at least more of the interior frame area and being anchored to the frame so as to be engagable with the wind to thereby cause rotation of the frame about the support bar, said sheet having first and second opposing sides;

wherein the plurality of vanes comprises lower vanes and higher vanes and wherein the support bars of lower vanes are located directly beneath higher vanes such that distal ends of the higher vanes engageably overlap one side of said support bars of lower vanes for blocking rotational movement of the vanes in a first rotational direction, to enable the wind to engage against the first sides of the sheets of the vanes and force the vanes against said support bars of lower vanes to cause rotation of the shaft means, such that the wind is also enabled to engage against the second sides of the sheets of the vanes to rotatably lift and blow past the vanes when rotation of the shaft means causes said second sides to face the wind to thereby enable continuous rotational wind-driven movement of the shaft means, wherein each frame comprises first and second spaced-apart rods and a cross bar intercoupling said rods;

blocking shoulders extending outwardly from the support bars, said blocking shoulders being configured and dimensioned to engage with the cross bars of the frames which are coupled to said support bars when said frames are rotated in a second rotational direction opposite the first rotation direction to thereby limit rotational movement of said frames in said second rotational direction to a predetermined angle relative to a vertical plane.

8. A wind driven apparatus comprising:

elongate shaft means;

receiving means for rotatably receiving the elongate shaft means such that said elongate shaft means is rotatably journaled within the receiving means to thereby permit rotational movement of said shaft means about a longitudinal axis thereof;

wind-engaging means disposed on the shaft means for engaging with the wind to thereby cause rotation of the shaft means, said wind-engaging means including a plurality of vanes, each vane comprising:

a support bar having a longitudinal axis and extending outwardly from the shaft means and terminating in a distal end;

a rigid frame defining an interior frame area and being coupled to the support bar so as to hang downwardly therefrom, the interior frame area having a geometric centroid and the frame having a center of mass which resides above said geometric centroid when the frame hangs downwardly from the support bar, said frame being rotatably disposed so as to be rotatable above the longitudinal axis of the support bar; and a sheet of wind-resistant material extending across and covering at least most of the interior frame area and being anchored to the frame so as to be engagable with the wind to thereby cause rotation of the frame about the support bar, said sheet having first and second opposing sides;

wherein the plurality of vanes comprises lower vanes and higher vanes and wherein the support bars of lower vanes are located directly beneath higher vanes such that distal ends of the higher vanes engageably overlap one side of said support bars of lower vanes for blocking rotational movement of the vanes in a first rotational direction, to enable the wind to engage against the first sides of the sheets of the vanes and force the vanes against said support bars of lower vanes to cause rotation of the shaft means, such that the wind is also enabled to engage against the second sides of the sheets of the vanes to rotatably lift and blow past the vanes when rotation of the shaft means causes said second sides to face the wind to thereby enable continuous rotational wind-driven movement of the shaft means;

wherein the plurality of vanes are arranged in a radial array of a plurality of columns of vanes disposed substantially equidistantly about the shaft means, said apparatus further comprising:

disabling means attached to at least some of the frames of at least one of the columns of vanes for selectively rotating said frames upwardly out of engagement with at least some of the wind to thereby reduce engagement of the wind against the sheets of the vanes so as to selectively control rotational velocity of the shaft means;

wherein the disabling means further comprises:

a plurality of eyelets secured to at least some of the support bars of at least a first column of vanes;

a corresponding plurality of pull cables secured at first ends thereof to at least some of the frames of at least a second column of vanes adjacent to said first column of vanes, said pull cables having opposing second ends which are passed through the eyelets for securing to a control cable, each eyelet being located higher than the secured first end of the pull cable extending through said eyelet; and a control cable attached to said opposing second ends of the pull cables, said control cable being retractable to thereby advance the pull cables through the eyelets to thereby lift the frames of the second column of vanes and permit at least some of the wind to pass beneath said upwardly lifted frames.

9. A wind driven apparatus for catching wind to thereby cause rotation of shaft means, said apparatus comprising:

elongate shaft means;

receiving means for rotatably receiving the elongate shaft means such that said elongate shaft means is rotatably journaled within the receiving means to thereby permit rotational movement of said shaft means about a longitudinal axis thereof;

wind-engaging means disposed on the shaft means for engaging with the wind to thereby cause rotation of the shaft means, said wind-engaging means including a plurality of vanes arranged in a plurality of columns disposed about the shaft means, each vane comprising:

a support bar having a longitudinal axis and extending outwardly from the shaft means and terminating in a distal end;

a rigid frame coupled to the support bar so as to hang downwardly therefrom, said frame defining an interior frame area and being rotatably disposed so as to be rotatable about the longitudinal axis of the support bar; and a sheet of wind-resistant material extending across and covering at least most of the interior frame area and being anchored to the frame so as to be engagable with the wind to thereby cause rotation of the frame about the support bar, said sheet having first and second opposing sides;

wherein the plurality of vanes comprises lower vanes and higher vanes and wherein the support bars of lower vanes are located directly beneath higher vanes such that distal ends of the higher vanes engageably overlap one side of said support bars of lower vanes for blocking rotational movement of the vanes in a first rotational direction, to enable the wind to engage against the first sides of the sheets of the vanes and force the vanes against said support bars of lower vanes to cause rotation of the shaft means, such that the wind is also enabled to engage against the second sides of the sheets of the vanes to rotatably lift and blow past the vanes when rotation of the shaft means causes said second sides to face the wind to thereby enable continuous rotational wind-driven movement of the shaft means; and disabling means attached to at least some of the frames of at least one of the columns of vanes for selectively rotating said frames upwardly out of engagement with at least some of the wind to thereby reduce engagement of the wind against the sheets of the vanes so as to selectively control rotational velocity of the shaft means, wherein the disabling means further comprises:

a plurality of eyelets secured to at least some of the support bars of at least a first column of vanes;

a corresponding plurality of pull cables secured at first ends thereof to at least some of the frames of at least a second column of vanes adjacent to said first column of vanes, said pull cables having opposing second ends which are passed through the eyelets for securing to a control cable, each eyelet being located higher than the second first end of the pull cable extending through said eyelet; and a control cable attached to said opposing second ends of the pull cables, said control cable being retractable to thereby advance the pull cables through the eyelets to thereby lift the frames of the second column of vanes and permit at least some of the wind to pass beneath said upwardly lifted frames.

10. An apparatus as defined in claim 9, wherein the disabling means further comprises cable means attached to said at least some of the frames of one of the columns of vanes, said cable means being selectively retractable to thereby rotatably raise said frames upwardly.

11. An apparatus as defined in claim 10, wherein the disabling means further comprises shock absorbing means disposed on the cable means for absorbing impact forces which might become applied to the cable means.

12. An apparatus as defined in claim 9, wherein the disabling means is configured to raise upwardly the frames of an entire column of vanes to substantially horizontal positions to thereby prevent significant engagement of the wind against the sheets of said entire column of vanes to thereby stop rotational movement of the shaft means.

13. A wind driven apparatus comprising:

elongate shaft means;

receiving means for rotatably receiving the elongate shaft means such that said elongate shaft means is rotatably journaled within the receiving means to thereby permit rotational movement of said shaft means about a longitudinal axis thereof;

wind-engaging means disposed on the shaft means for engaging with the wind to thereby cause rotation of the shaft means, said wind-engaging means including a plurality of vanes arranged in a radial array of three radial columns of vanes, said columns being disposed substantially equidistantly from each other about the shaft means, each vane comprising:

a support bar having a longitudinal axis and extending outwardly from the shaft means and terminating in a distal end;

a rigid frame defining an interior frame area and being coupled to the support bar so as to hang downwardly therefrom, the interior frame area having a geometric centroid and the frame having a center of mass which resides above said geometric centroid when the frame hangs downwardly from the support bar, said frame being rotatably disposed so as to be rotatable about the longitudinal axis of the support bar; and a sheet of wind-resistant material extending across and covering at least most of the interior frame area and being anchored to the frame so as to be engagable with the wind to thereby cause rotation of the frame about the support bar, said sheet having first and second opposing sides;

blocking means secured to the shaft means for blocking rotational movement of the frame in a first rotational direction, to enable the wind to engage against the first side of the sheet and force the frame against said blocking means to cause rotation of the shaft means, such that the wind is also enabled to engage against the second side of the sheet to rotatably lift and blow past the sheet and frame when rotation of the shaft means causes said second side to face the wind to thereby enable continuous rotational wind-driven movement of the shaft means;

wherein each frame extends along only a portion of its corresponding support bar so as to provide a substantial gap between the frame and the shaft means sufficient to permit air currents to pass between the frame and the shaft means to thereby reduce air pressure buildup, wherein the gap is at least as wide as the frame.

* * * * *